(12) United States Patent
Schnoebelen et al.

(10) Patent No.: US 9,494,050 B2
(45) Date of Patent: Nov. 15, 2016

(54) CONCENTRIC NOZZLES FOR ENHANCED MIXING OF FLUIDS

(71) Applicant: The Boeing Company, Chicago, IL (US)

(72) Inventors: Joseph K. Schnoebelen, Renton, WA (US); Kurt E. Acheson, Seattle, WA (US)

(73) Assignee: The Boeing Company, Chicago, IL (US)

(*) Notice: Subject to any disclaimer, the term of this patent is extended or adjusted under 35 U.S.C. 154(b) by 589 days.

(21) Appl. No.: 14/033,409

(22) Filed: Sep. 20, 2013

(65) Prior Publication Data

US 2015/0086333 A1    Mar. 26, 2015

(51) Int. Cl.
| | |
|---|---|
| *B64D 15/04* | (2006.01) |
| *F01D 25/24* | (2006.01) |
| *F02C 7/047* | (2006.01) |
| *B64D 33/02* | (2006.01) |

(52) U.S. Cl.
CPC ............... *F01D 25/24* (2013.01); *B64D 15/04* (2013.01); *B64D 33/02* (2013.01); *F02C 7/047* (2013.01); *B64D 2033/0233* (2013.01); *F05D 2210/40* (2013.01)

(58) Field of Classification Search
CPC ............... F01D 25/24; F05B 2240/14; F05B 2260/208; F02C 7/047; F02C 6/08; B64D 15/04; B64D 2033/0233; B64D 2033/0286; B64D 15/00; B64D 15/02; B64D 15/06; B64D 15/08; B64D 15/10; B64D 2013/0618; B64D 29/00; B64D 33/02
See application file for complete search history.

(56) References Cited

U.S. PATENT DOCUMENTS

| | | |
|---|---|---|
| 1,794,276 A | 2/1931 | Bowes |
| 3,735,778 A | 5/1973 | Garnier |
| 3,747,874 A | 7/1973 | Johnsen |
| 3,749,336 A | 7/1973 | Christensen et al. |
| 4,474,259 A | 10/1984 | Wright |
| 4,519,423 A | 5/1985 | Ho et al. |
| 4,533,101 A * | 8/1985 | Patterson, Jr. ........ B64C 23/065 244/199.3 |
| 4,567,960 A | 2/1986 | Johnson et al. |
| 4,688,745 A | 8/1987 | Rosenthal |
| 5,088,277 A | 2/1992 | Schulze |
| 5,402,938 A | 4/1995 | Sweeney |
| 5,992,763 A | 11/1999 | Smith et al. |
| 6,267,328 B1 | 7/2001 | Vest |
| 6,354,538 B1 | 3/2002 | Chilukuri |
| 6,585,191 B2 | 7/2003 | Andre et al. |
| 6,666,016 B2 | 12/2003 | Papamoschou |
| 7,637,099 B2 | 12/2009 | Ranganathan et al. |
| 8,061,657 B2 | 11/2011 | Rocklin et al. |

(Continued)

FOREIGN PATENT DOCUMENTS

| | | |
|---|---|---|
| EP | 2204320 | 7/2010 |
| EP | 2354493 A2 | 8/2011 |
| WO | 2012166058 A1 | 12/2012 |

*Primary Examiner* — Dwayne J White
*Assistant Examiner* — Danielle M Christensen
(74) *Attorney, Agent, or Firm* — Miller, Matthias & Hull LLP

(57) ABSTRACT

An article for mixing ambient fluid with a motive fluid comprises a conduit, and thermally conductive concentric inner and outer nozzles extending from the conduit. The conduit is configured to supply the motive fluid to the outer nozzle and the ambient fluid to the inner nozzle. The inner nozzle extends further downstream from the conduit than the outer nozzle.

18 Claims, 5 Drawing Sheets

(56) References Cited

U.S. PATENT DOCUMENTS

| | | |
|---|---|---|
| 8,365,533 B2 | 2/2013 | Johnson et al. |
| 2002/0027180 A1 | 3/2002 | Porte et al. |
| 2009/0139217 A1 | 6/2009 | Eifert et al. |
| 2010/0150699 A1* | 6/2010 | Nicolas .................. F04D 25/08 415/90 |
| 2011/0039491 A1 | 2/2011 | Khalifa et al. |
| 2012/0248250 A1 | 10/2012 | Porte et al. |

* cited by examiner

CONCENTRIC NOZZLES FOR ENHANCED MIXING OF FLUIDS

BACKGROUND

An aircraft may include an engine nacelle for housing a gas turbine engine. The forward most section of the engine nacelle is referred to as a "lipskin." Conventional lipskins are made of aluminum.

An aircraft may utilize high temperature, high pressure air to prevent ice formation on the lipskin. The hot air may be ejected into a lipskin cavity, where it mixes with ambient air within the cavity to heat the lipskin. The high temperature, high pressure air may be supplied from a compressor bleed port of the engine.

Increasing the operating pressure and temperature of gas turbine engines is highly desirable because it can improve overall propulsive efficiency. However, a problem can occur if the operating temperature approaches or exceeds the use point of certain grades of aluminum typically used for engine nacelle lipskins.

To overcome this problem, higher grade materials such as aluminum alloys and titanium may be used instead to prevent structural distortion of the lipskin. However, the use of these higher grade materials is undesirable, as the higher grade materials are more expensive in raw form, and they are more expensive to form into lipskins.

SUMMARY

According to an embodiment herein, an article for mixing ambient fluid with a motive fluid comprises a conduit, and thermally conductive concentric inner and outer nozzles extending from the conduit. The conduit is configured to supply the motive fluid to the outer nozzle and the ambient fluid to the inner nozzle. The inner nozzle extends further downstream from the conduit than the outer nozzle.

According to another embodiment herein, an engine nacelle lipskin comprises a channel forming a lipskin cavity, and an article secured to the channel. The article includes a conduit and thermally conductive concentric inner and outer nozzles extending from the conduit. The conduit is secured to the channel such that the nozzles are located within the cavity and oriented in a direction of anti-icing flow. The conduit is configured to supply motive fluid to the outer nozzle and ambient fluid within the cavity to the inner nozzle.

According to another embodiment herein, a method comprises mounting thermally conductive concentric inner and outer nozzles within a lipskin cavity of an engine nacelle such that ambient air flowing within the cavity is supplied to an inlet of the inner nozzle. The method further comprises coupling a bleed air source to an inlet of the outer nozzle.

According to another embodiment herein, a method comprises heating an engine nacelle lipskin. A jet stream of high pressure, high temperature air is ejected into a cavity of the lipskin via a nozzle. Ambient air surrounding the nozzle mixes with the jet stream. A stream of ambient air is supplied through a central portion of the jet stream. The jet stream expands to ambient pressure before being mixed with the ambient air stream.

These features and functions may be achieved independently in various embodiments or may be combined in other embodiments. Further details of the embodiments can be seen with reference to the following description and drawings.

DETAILED DESCRIPTION

Figure 1A:
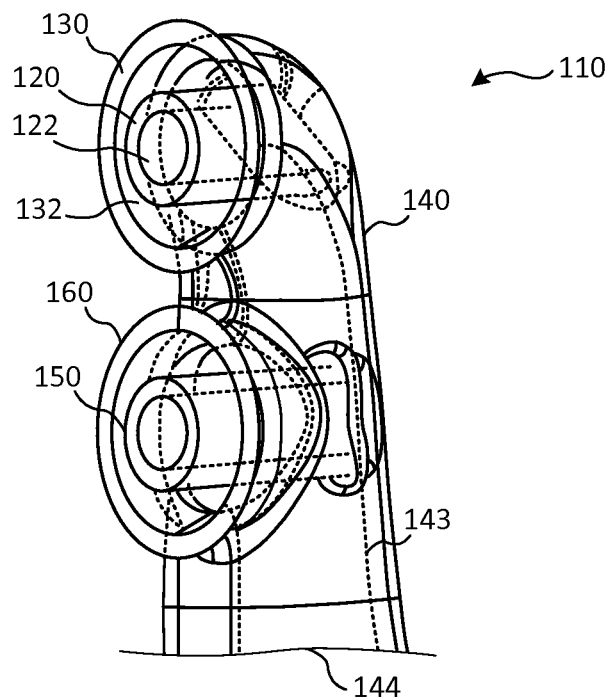
FIGS. 1A-1C are illustrations of an article including concentric nozzles for mixing an ambient fluid with a motive fluid.
Figure 1B:
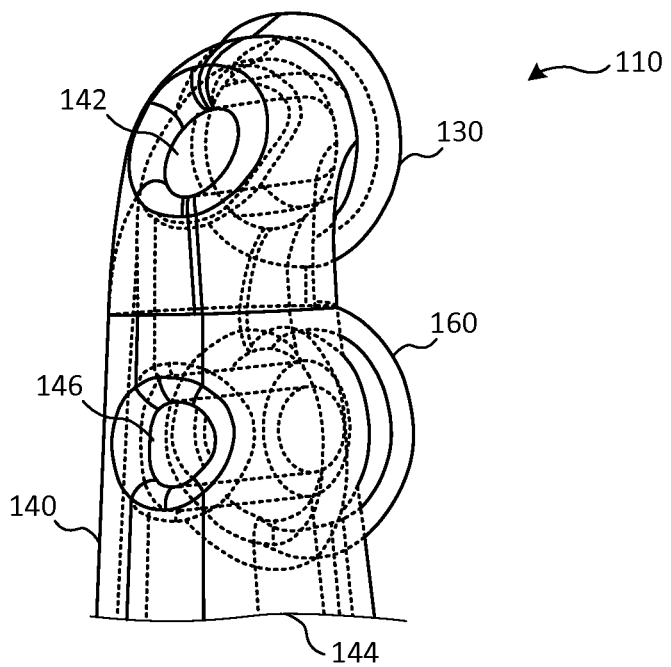
Figure 1C:
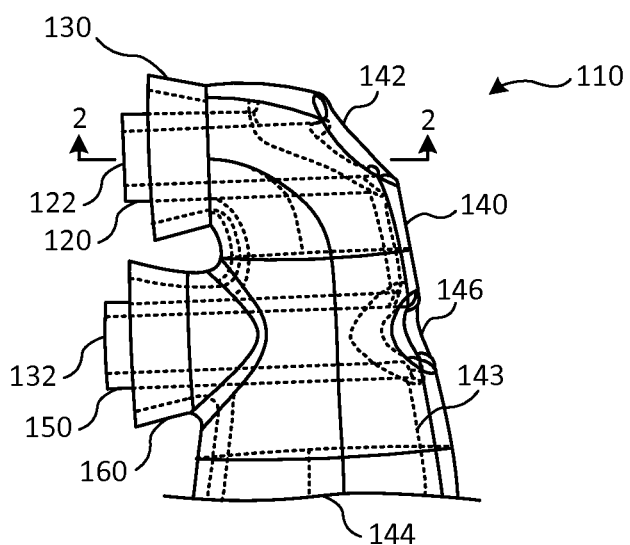

Reference is made to FIGS. 1A-1C, which illustrate an article 110 for mixing a motive fluid with ambient fluid in an ambient environment. The article 110 includes an inner nozzle 120, and an outer nozzle 130 surrounding the inner nozzle 120. Collectively, these concentric nozzles 120 and 130 will be referred to as the "first nozzle pair."

Figure 2:
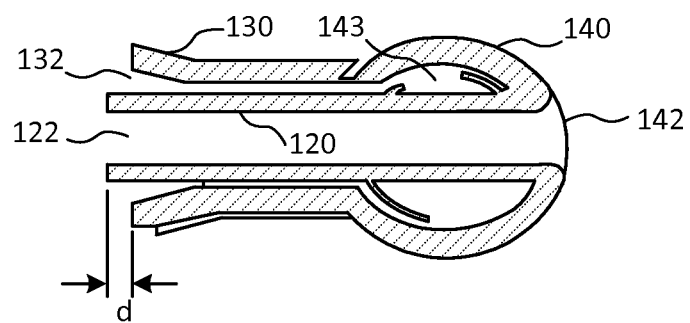
FIG. 2 is an illustration of a cross-section of concentric nozzles of the article, the cross section taken along lines 2-2 of FIG. 1C.

Additional reference is made to FIG. 2. The article 110 further includes a conduit 140. The nozzles 120 and 130 extend from one side of the conduit 140. A first inlet 142 is located at an opposite side of the conduit 140, in axial alignment with the inner nozzle 120. The first inlet 142 is configured to allow the ambient fluid to pass through the conduit 140 to the inner nozzle 120, and exit at an orifice 122 of the inner nozzle 120 (the orifice 122 is most clearly shown in FIG. 2). The inner nozzle 120 may include a convergent section at the first inlet 142. In some embodiments, the inner nozzle 120 may then have a downstream section of uniform cross-section that terminates at the orifice 122. In other embodiments, the downstream section may have a uniform cross-section that diverges at the orifice 122.

The article 110 also includes a second inlet 144 at an end of the conduit 140 for receiving the motive fluid. The motive fluid flows through a passage 143 inside the conduit 140 and is turned 90 degrees before entering the outer nozzle 130. The outer nozzle 130 channels the flow to a minimum nozzle area just before exiting through an orifice 132. The outer nozzle 130 may terminate in a divergent section (as illustrated in FIGS. 1A-1C and 2).

The nozzles 120 and 130 are made of a thermally conductive material such as Inconel 625 or equivalent material. The outer nozzle 130 is configured to dissipate heat from the motive fluid and transfer the heat to the ambient environment. The outer nozzle 130 is not insulated or shrouded. The outer nozzle 130 may have features (e.g., ridges) that increase surface area for heat transfer.

Consider the example where the motive fluid is compressed and substantially hotter (e.g., 100-200° C. hotter) than the ambient fluid. The motive fluid is supplied to the outer nozzle 130, which dissipates heat as the motive fluid flows through the outer nozzle 130. The motive fluid exits through the orifice 132 as a high speed jet. When the edge of the jet encounters the ambient fluid, shear between the two fluids occurs, whereby the higher speed jet drags the lower speed ambient flow alongside. That is, entrainment occurs.

As best seen in FIGS. 1C and 2, the orifice 122 of the inner nozzle 120 is further downstream than the orifice 132 of the outer nozzle 130. The distance (d) downstream of the orifice 132 is sufficient for the flow from the outer nozzle 130 to expand to ambient pressure prior to reaching the exit station of the inner nozzle 120. Thus, the length of the inner nozzle 120 is determined by the operating total pressure of the outer nozzle 130. As but one example, the downstream distance d between the orifices 122 and 132 is nominally one-half the diameter of the inner nozzle 120. More generally the downstream distance d may be in a range between one-quarter the inner nozzle diameter and one full inner nozzle diameter. This feature further enhances entrainment as the entrained cool air in the center will fill the inner nozzle 120 from the ambient air entering the inlet 142. If the inner nozzle orifice 122 is not sufficiently downstream of the outer nozzle orifice 132, flow from the outer nozzle 130 may suppress ambient cooling from the inner nozzle 120.

Thus, entrainment occurs on both on the inner and outer edges of the jet. Consequently, core temperature and pressure of the high speed jet (exiting the outer nozzle orifice 132) decays rapidly.

The article 110 of FIGS. 1A-1C also has a second nozzle pair. The second nozzle pair includes a second thermally conductive inner nozzle 150 in fluid communication with a third inlet 146 in the conduit 140, and a second outer nozzle 160 surrounding the second inner nozzle 150. The first and second nozzle pairs may be on the same side of the conduit 140, and the first and third inlets 142 and 146 may be on the same side of the conduit 140. The third inlet 146 may be in axial alignment with the second inner nozzle 150. The second nozzle pair may have a similar construction to the first nozzle pair.

The second nozzle pair functions identically to the first nozzle pair to further enhancing the overall entrainment of the motive and ambient fluids. The two nozzle pairs enable faster mixing than a single nozzle pair (given the same total exit area, two nozzles will mix faster as mixing length is a direct function of nozzle orifice diameter). The addition of the second nozzle pair adds relatively low cost and complexity to the article 110.

The nozzles 120, 130, 140 and 150 and the conduit 140 may formed as a unitary part, for example, by casting. Thus, creation and cooling of the jet stream is achieved passively by an article that is relatively easy to manufacture and maintain.

An article herein is not limited to the article 110 illustrated in FIGS. 1A-1C and 2. For instance, some embodiments may include only a single nozzle pair, while others may have more than two nozzle pairs.

FIGS. 1A-1C and 2 show the two nozzle pairs as being aligned. However, an article herein is not so limited. In some embodiments, the two nozzle pairs may have different exit angles with respect to the conduit 140.

An article herein is not limited to inner nozzles having their own dedicated inlets 142 and 146. In some embodiments, the inner nozzles may share a common inlet port. However, the dedicated inlets 142 and 146 reduce overall wetted area and maximize the local flow (less wetted area for the same cooling area means that the article weighs less for the same cooling effectiveness). In other embodiments, each inner nozzle may have multiple inlets (e.g., inlets on sides of the conduit).

An article herein is not limited to any particular application. Applications include, but are not limited to, anti-icing of an engine nacelle lipskin.

Figure 3:
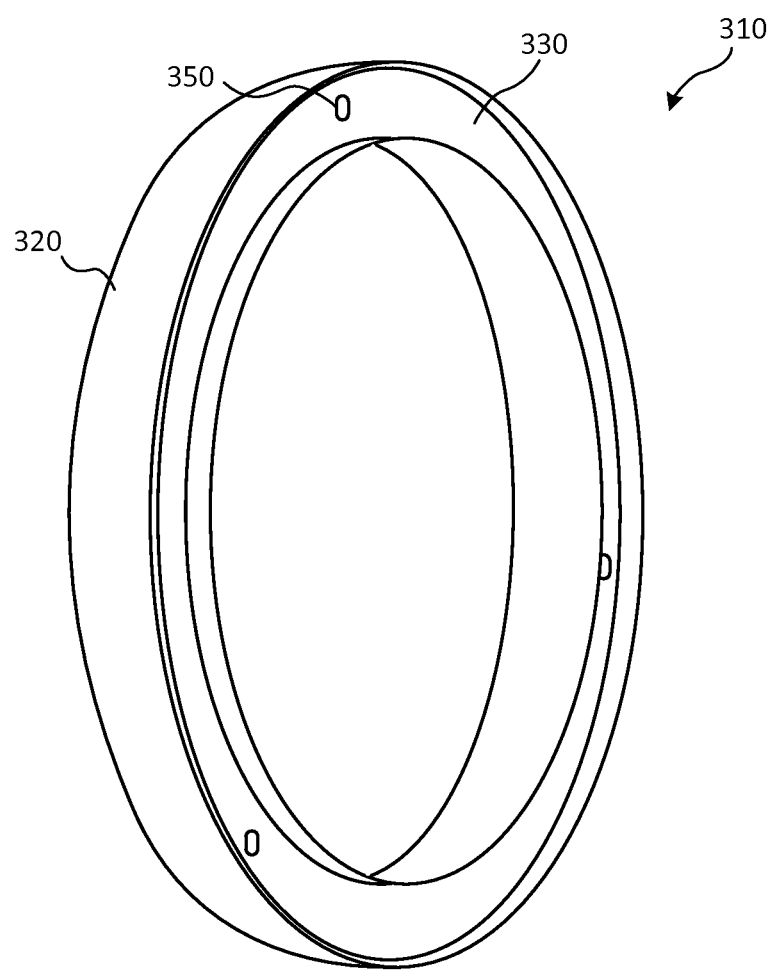
FIG. 3 is an illustration of an engine nacelle lipskin.
Figure 4:
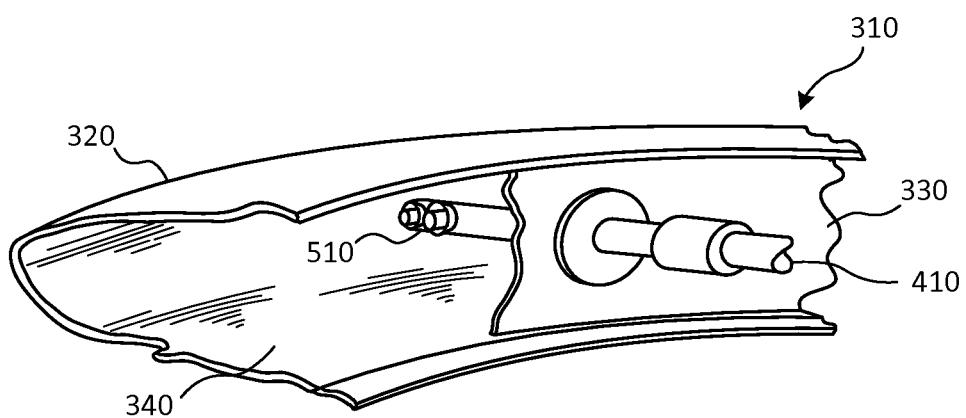
FIG. 4 is an illustration of an anti-ice article attached to an aft bulkhead of the engine nacelle lipskin.

Reference is now made to FIGS. 3 and 4, which illustrate a lipskin 310 of an engine nacelle. The engine nacelle houses an engine core, and the lipskin 310 forms the forward-most section of the nacelle. The lipskin 310 may include skin 320 and a bulkhead 330 that form a channel defining a lipskin cavity 340. The lipskin 310 may be formed from a single piece or multiple sectors. Although FIG. 3 shows a channel that is circular, an engine nacelle lipskin herein is not so limited. The skin 320 of the lipskin 310 may be made of nominal grade aluminium.

The engine nacelle lipskin 310 further includes an anti-ice system. The anti-ice system may include one or more articles 510 including concentric nozzles for enhanced mixing of a motive fluid with ambient fluid. Multiple articles 510 may be distributed uniformly around the channel.

FIG. 3 shows three openings 350 for mounting three articles 510 to the bulkhead 330. FIG. 3 also shows the openings 350 uniformly distributed about the bulkhead 330. FIG. 4 shows an article 510 mounted to the bulkhead 330, through one of the openings 350.

Figure 5:
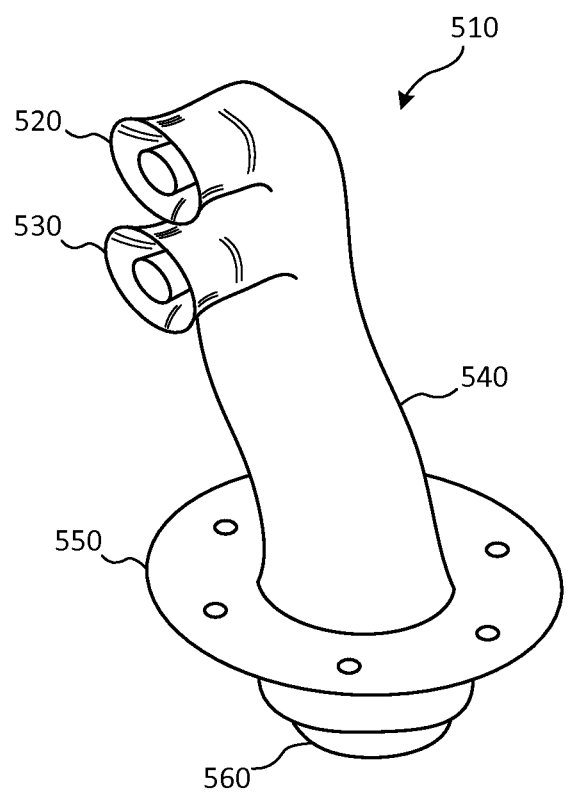
FIG. 5 is an illustration of an article including concentric nozzles for enhanced mixing of a motive fluid with ambient fluid, the article configured for the engine nacelle lipskin.

Reference is now made to FIG. 5. The article 510 of FIG. 5 includes first and second nozzle pairs 520 and 530 extending from a first end of a conduit 540. The article further includes a mounting flange 550 near an opposite second end of the conduit 540, and a motive fluid inlet 560 at the second end of the conduit 540.

Figure 6:
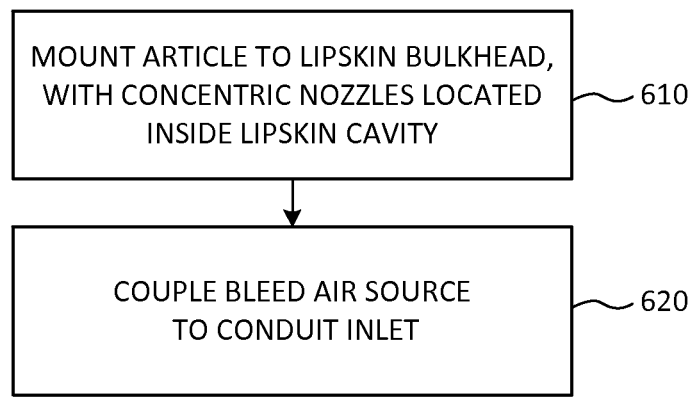
FIG. 6 is an illustration of a method of installing the article of FIG. 5 in the engine nacelle lipskin.

Reference is now made to FIG. 6, which is an illustration of a method of installing one of the articles 510 in the engine nacelle lipskin 310. At block 610, the article 510 is mounted to the bulkhead 330. The inlet 560 extends through one of the openings 350 in the bulkhead 330, and the flange 550 is fastened to the bulkhead 330.

The concentric inner and outer nozzles of each pair 520 and 530 are located within the lipskin cavity 340 and oriented such that a full flow of swirling air can enter into the inlets of the inner nozzles. The nozzle pairs 520 and 530 may be canted to create a swirl within the lipskin cavity 340.

At block 620, a bleed air source is coupled to the inlet 560 of the conduit 540. For example, a line 410 (see FIG. 4) may couple the inlet 560 to a compressor bleed port of a gas turbine engine. Temperature of the bleed air may exceed the maximum allowable temperature of the nominal grade aluminium use for the skin 320 of the lipskin 310.

Figure 7:
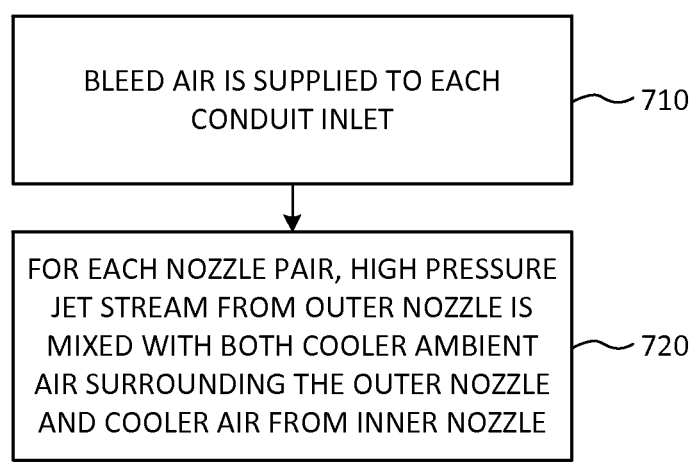
FIG. 7 is an illustration of a method of operating an anti-ice system.

Reference is now made to FIG. 7, which illustrates the operation of an anti-ice system including one or more of the articles 510 of FIG. 5. At block 710, bleed air is supplied to each conduit inlet 560 and, therefore, to the outer nozzles of each article 510. Temperature of the bleed air may exceed the maximum allowable temperature of nominal grade aluminium.

At block 720, for each nozzle pair 520 and 530, a high pressure, high temperature jet stream is ejected from the outer nozzle in an anti-icing direction and flows into the lipskin cavity 340. Each jet stream mixes with the lower pressure, cooler air surrounding its outer nozzle through shear layer entrainment. The high pressure jet stream also mixes with the cooler air ejected from the inner nozzle through shear layer entrainment. The high pressure jet stream expands to ambient pressure before being mixed with the cooler air stream. Entrainment on the inner and outer edges of each jet stream reduces jet temperatures below the maximum allowable temperature of the skin's nominal grade aluminum.

The circulating mass of air heats the lipskin 310 to prevent ice formation on the lipskin 310. Efficiency is maximized by distribution of the high pressure flow uniformly around the lipskin 310.

The jet streams are directed towards the skin 320. Each jet stream impinging the skin 320 creates a hot spot on the skin 320. Even though temperature of the bleed air may exceed the maximum allowable temperature of nominal grade aluminium, the jet stream has been rapidly cooled below the skin's maximum allowable temperature before it reaches the skin 320.

This enables the skin 320 to be made of relatively inexpensive aluminium without having to resort to higher grade materials, which are more expensive in raw form, and more expensive to form into a lipskin.

An article herein is not limited to an engine nacelle lipskin. Another application may be noise suppression in a jet engine nozzle having a convergent portion, throat, and divergent portion. An article herein may be located within the divergent portion. Noise suppression is achieved through reduction in the bulk velocity of a jet, as jet noise is proportional to the log of velocity. An article herein can rapidly reduce jet bulk temperature and velocity to achieve a substantial reduction in jet noise.

Yet another application for an article herein is to enhance movement of ambient air in an engine bay. By rapidly reducing jet stream temperature, an article herein can eliminate the need for insulation on a wall of the engine bay to prevent thermal degradation of material properties due to local hot spots.

The invention claimed is:

1. An article for mixing ambient fluid with a motive fluid, the article comprising:
    a conduit; and
    thermally conductive concentric inner and outer nozzles extending from the conduit;
    the conduit configured to supply the motive fluid to the outer nozzle and the ambient fluid to the inner nozzle;
    wherein the inner nozzle extends further downstream from the conduit than the outer nozzle by a distance that is sufficient for flow from the outer nozzle to expand to ambient pressure prior to reaching an exit station of the inner nozzle.

2. The article of claim 1, wherein the inner nozzle extends downstream of the outer nozzle by a downstream distance equal to about one-quarter diameter of the inner nozzle to one full diameter of the inner nozzle.

3. The article of claim 1, wherein the nozzles extend from a first side of the conduit; and wherein an inlet to the inner nozzle is located at an opposite side of the conduit in axial alignment with the inner nozzle.

4. The article of claim 1, wherein the conduit is configured to turn the motive fluid about 90 degrees before entering the outer nozzle.

5. The article of claim 1, further comprising a second pair of thermally conductive concentric inner and outer nozzles extending from the conduit, wherein the inner nozzle of the second pair extends further downstream from the conduit than the outer nozzle of the second pair.

6. The article of claim 5, wherein the conduit defines a first passage for supplying the motive fluid to the outer nozzle of each pair.

7. The article of claim 5, wherein the nozzles extend from a first side of the conduit; and wherein inlets to the inner nozzles are located at an opposite side of the conduit and axially aligned with their corresponding inner nozzles.

8. An engine nacelle lipskin comprising:
    a channel forming a lipskin cavity; and
    an article including a conduit and thermally conductive concentric inner and outer nozzles extending from the conduit with the inner nozzle extending further downstream from the conduit than the outer nozzle by a distance that is sufficient for flow from the outer nozzle to expand to ambient pressure prior to reaching an exit station of the inner nozzle, the conduit secured to the channel such that the nozzles are located within the cavity and oriented in a direction of anti-icing flow, the conduit configured to supply motive fluid to the outer nozzle and ambient fluid within the cavity to the inner nozzle.

9. The engine nacelle lipskin of claim 8, further comprising a second pair of thermally conductive concentric inner and outer nozzles extending from the conduit, wherein the inner nozzle of the second pair extends further downstream from the conduit than the outer nozzle of the second pair.

10. The engine nacelle lipskin of claim 8, wherein the nozzles extend from a first side of the conduit; and wherein an inlet to the inner nozzle is located at an opposite side of the conduit in axial alignment with the inner nozzle.

11. The engine nacelle lipskin of claim 8, wherein the second inlet of the article is coupled to a source of high temperature, high pressure air.

12. The engine nacelle lipskin of claim 8, wherein the channel includes skin made of nominal grade aluminum.

13. A method comprising:
    mounting thermally conductive concentric inner and outer nozzles within a lipskin cavity of an engine nacelle such that ambient air flowing within the cavity is supplied to an inlet of the inner nozzle; and
    coupling a bleed air source to an inlet of the outer nozzle to eject a jet stream of high pressure, high temperature air into the lipskin cavity, wherein the jet stream expands to ambient pressure before being mixed with the ambient air.

14. A method comprising heating an engine nacelle lipskin, including:
    ejecting a jet stream of high pressure, high temperature air into a cavity of the lipskin via a nozzle, wherein ambient air surrounding the nozzle mixes with the jet stream; and
    supplying a stream of ambient air through a central portion of the jet stream, wherein the jet stream expands to ambient pressure before being mixed with the ambient air stream.

15. The method of claim 14, wherein the nozzle is an outer nozzle, and wherein the ambient air stream is supplied by an inner nozzle that is concentric with the outer nozzle.

16. The method of claim 15, further comprising also using a second concentric nozzle pair to eject a second jet stream of high temperature, high pressure air into the lipskin cavity.

17. The method of claim 14, further comprising supplying bleed air to an inlet of the nozzle.

18. The method of claim 14, wherein the bleed air has a higher temperature than maximum allowable temperature of aluminum skin of the lipskin.

\* \* \* \* \*